United States Patent [19]

Dingle et al.

[11] Patent Number: 5,148,139
[45] Date of Patent: Sep. 15, 1992

[54] FUSE SWITCH UNIT FOR PANELBOARDS

[75] Inventors: Phillip J. Dingle, Oxfordshire; Raymond W. Thomas; Kenneth Neill, both of Swindon, all of United Kingdom

[73] Assignee: Square D Company, Palatine, Ill.

[21] Appl. No.: 723,369

[22] Filed: Jun. 28, 1991

[51] Int. Cl.$^5$ .................. H01H 85/00; H02B 1/18
[52] U.S. Cl. .................................. 337/6; 361/349
[58] Field of Search .................. 337/6, 7, 8, 9, 10, 337/11; 361/349; 335/6, 43

[56] References Cited

U.S. PATENT DOCUMENTS

| | | | |
|---|---|---|---|
| 2,574,290 | 11/1951 | Rowe | 337/8 |
| 2,937,254 | 5/1960 | Ericson | 337/11 |
| 4,496,916 | 1/1985 | Carpenter | 337/6 |

Primary Examiner—Harold Broome
Attorney, Agent, or Firm—Kareem M. Irfan; Timothy H. Gens

[57] ABSTRACT

A fuse switch unit for use in a panelboard is provided which can be engaged via plug-on terminals with a busbar supply system. The unit includes a switch mechanism having in front thereof lug terminals for coupling fuse links which are adjacent the operating handle of the switch mechanism.

3 Claims, 3 Drawing Sheets

FUSE SWITCH UNIT FOR PANELBOARDS

BACKGROUND OF THE INVENTION

1. Field of the Invention

This invention relates to fuse switch units and switch units for use in panelboards for industrial applications.

2. Related Prior Art

It is known to provide, in industrial power systems, a modular arrangement in which molded case circuit breakers of standard module sizes may be plugged onto the busbars; see for example British Patent Nos. 1,161,030 and 1,181,893. One object of the present invention is to extend the usefullness of such arrangements by providing fuse switch units which may be plugged onto the busbars as an interchangeable alternative to circuit breakers.

SUMMARY AND OBJECTS OF THE INVENTION

Accordingly, the present invention provides for a switch unit comprising a housing of generally rectangular form, the housing having a number of faces. An inlet terminal is positioned on one of the faces of the housing for resilient engagement with a busbar; separable switch contacts are included which are electrically coupled with the inlet terminal. The housing includes a switch mechanism positioned therein that includes an operating handle which serves to open and close the contacts in a quick make and break manner. The switch includes an outlet terminal which is electrically coupled to the switch includes an outlet terminal which is electrically coupled to the switch mechanism and link means positioned within the housing adjacent the operating handle; the link means being electrically coupled in series with the inlet terminal, separable contacts and outlet terminal. Preferably, the link means comprises a fuse link which is located in front of the switch mechanism and adjacent to the operating handle of the switch unit.

An object of the present invention is to provide a switch unit having a more compact design and which provides for easy removal of fuses due to the proximity of the fuses with respect to the operating handle of the switch unit.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

Figure 1:
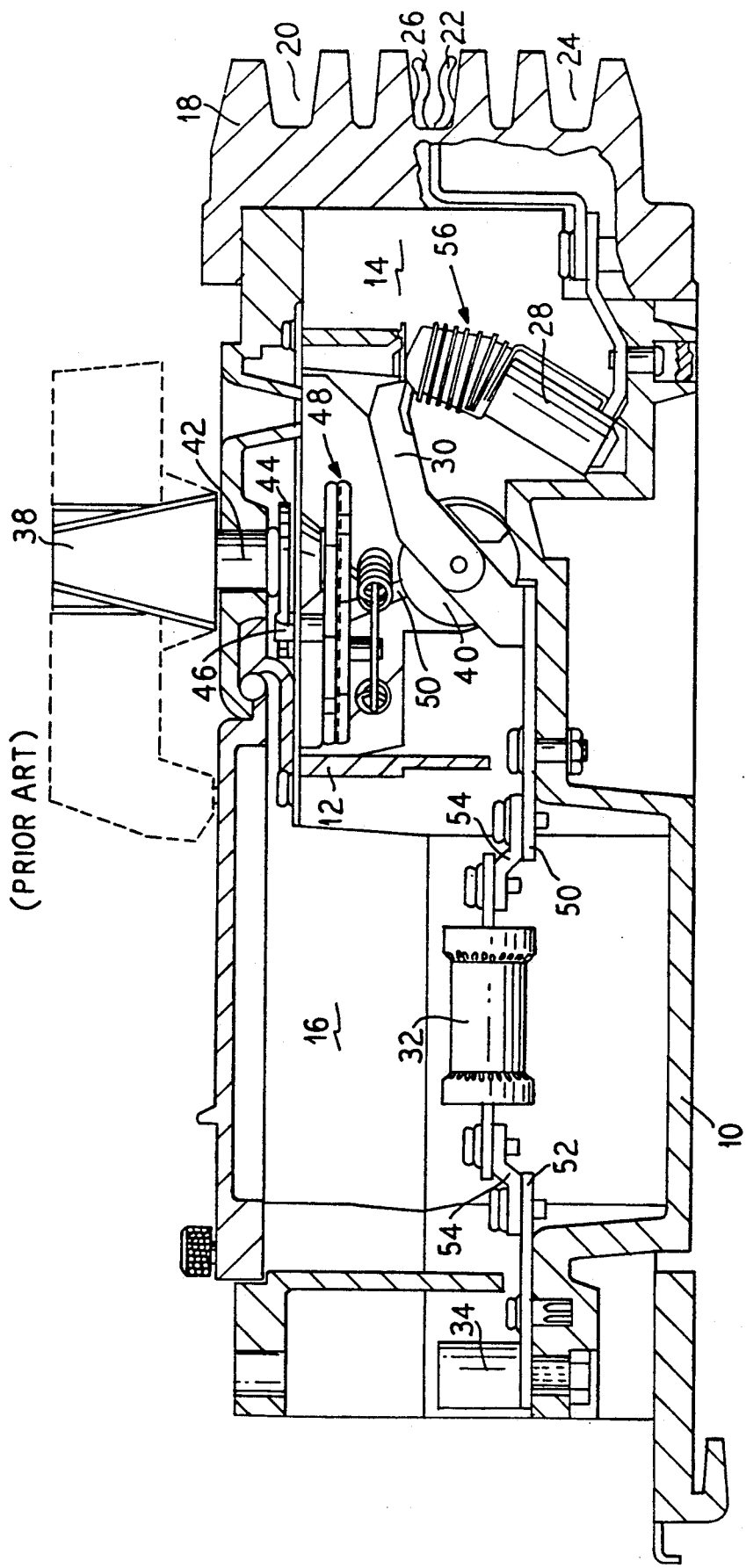
FIG. 1 is a cross-sectional elevation of a switch fuse unit of the prior art.

In order to understand more clearly the present invention, a short discussion of the prior art, in particular FIG. 1, will be provided. FIG. 1 illustrates a switch fuse unit having a molded plastic case 10 divided by a partition 12 into a switch compartment 14 and a fuse compartment 16. The unit would normally provide a switch and a fuse on each of three phases, only one phase being shown in the drawings. The input end of the case 10 is closed by a finned plastic block 18 forming three terminal channels 20, 22 and 24; the input terminal 26 shown is positioned in the channel 22, while terminals for the other phases (not shown) would be within channels 20 and 24. This "stab and shroud" structure is designed for use with l-Line (trademark) busbar distribution boards produced by Square D Company and the subject of the above-mentioned patents.

The input terminal 26 is located on one face of case 10 and is connected to a stationary switch 28 which cooperates with a movable switch contact blade 30 to make and break the circuit. Thereafter, the circuit passes via a fuse link 32 to output terminal 34 located on one face of the case 10. The other phases also have similar fuse links similar to fuse link 32. The movable contact blade 30 is mounted, with those of the other phases, in slots in an insulating shaft 40 rotatably mounted within the case 10. The path of contact movement is within an arc chute 56 of a known type. An external operating handle 38 secured to shaft 42 can be moved between the "off" position shown in full and the "on" position shown in broken lines. This rotates a claw member 44 secured to the shaft 42, which in turn drives a pin 46 which actuates a quick make and break mechanism, generally indicated at 48. The mechanism 48 is of the general type shown in British Patent No. 1,170,720, which is incorporated herein by reference. However, in this prior art arrangement, the claw member 44 replaces lever 46 of the earlier patent. Since the switching mechanism described in U.S. Pat. No. 4,496,916 and its accompanying busbar connect structure can also be used in the present invention such is hereby incorporated by reference.

FIG. 1 also shows the unit with a U.S. tag-type fuse link 32 bolted to fuse compartment lugs 50, 52 via adapter plates 54. Fuse links having standard dimensions of British Standard No. 88 (BS88) having offset tags can also be bolted directly to lugs 50, 52.

Figure 2:
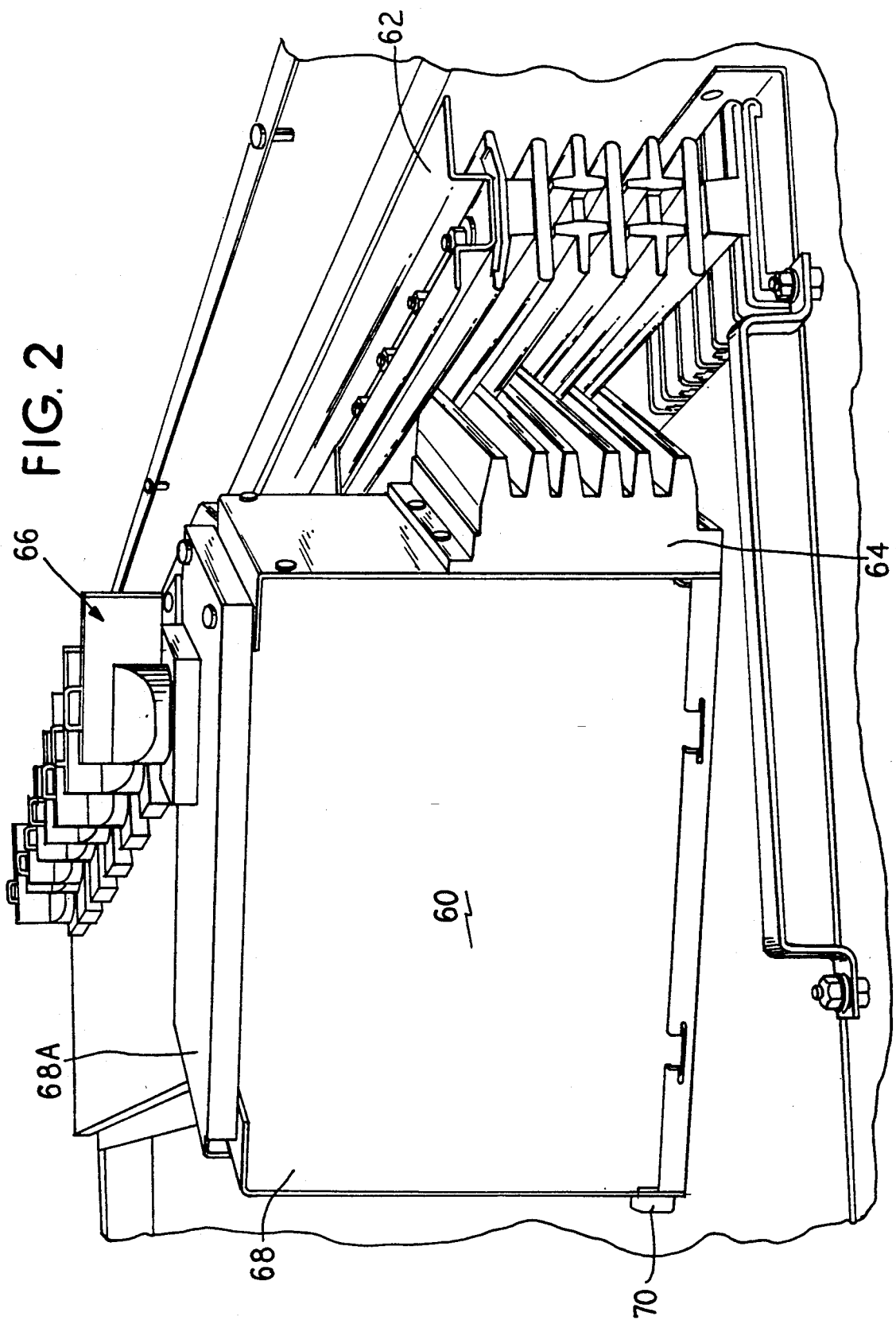
FIG. 2 is a perspective view of one embodiment of the fuse switch unit partially connected to a panelboard.

Referring now to FIG. 2, there is illustrated the switch unit 60 of the present invention that is partially disconnected from busbars 62 of a panelboard. Switch unit 60 includes plug-on connectors 64, which are shrouded and braced in a molded protective insulator, fuse switch handle 62, which operates the switch mechanism within the switch unit, cover 68A, which forms part of housing 68, and finally a mounting bracket 70, which forms part of the fuse switch housing which helps to support and align the load end of the fuse switch within the panelboard.

Figure 3:
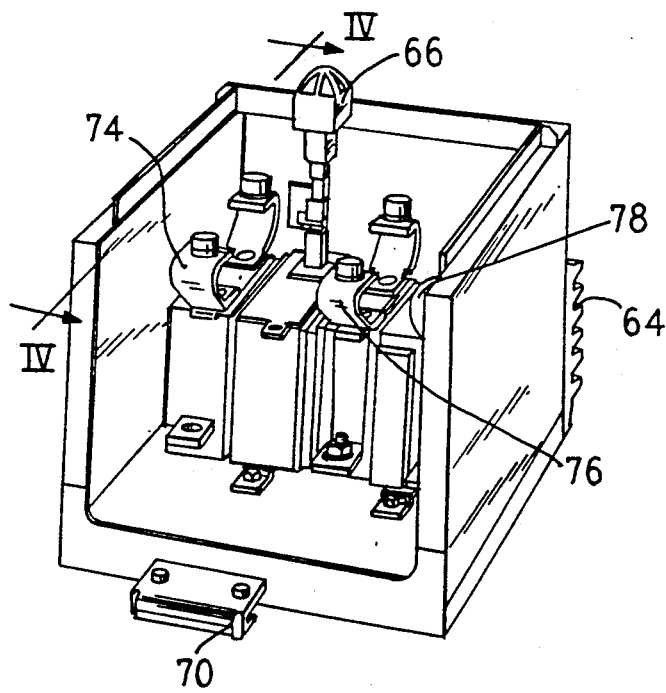
FIG. 3 illustrates one embodiment of the inside of the switch unit.
Figure 4:
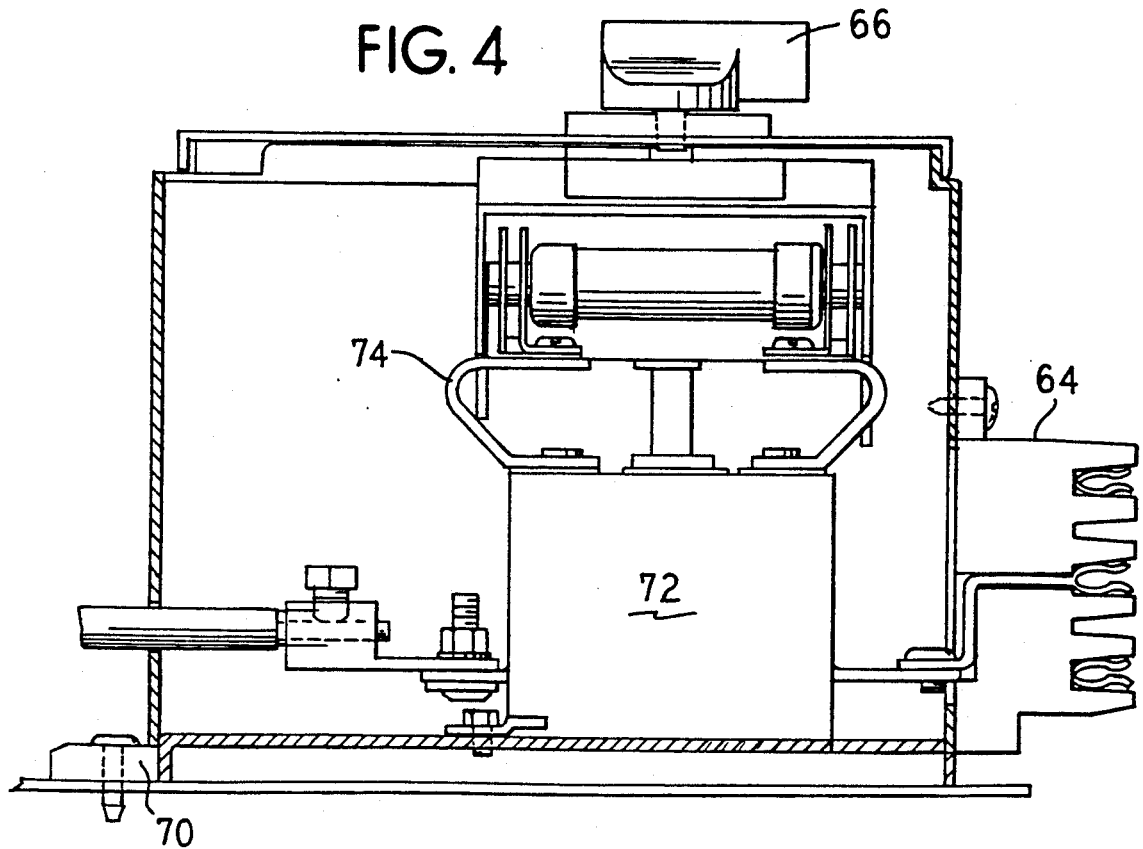
FIG. 4 illustrates a cross-sectional view of FIG. 3 along a line IV—IV just within the housing wall of the switch unit with a fuse connected across the fuse lugs.

Referring to FIG. 3, there is illustrated a fuse switch 60, with the top and side covers removed, exhibiting the switch mechanism 72. In the wall mounted position, switch unit 60 has lugs 74, 76 and 78 positioned in front of switch mechanism 72. An electrical conductor may be connected between lugs 74, 76 and 78 in order for the switch to operate simply as a non-fused switch unit. However, a fuse link 32, such as shown in FIG. 1, can be connected between the screws of lugs 74, 76 and 78 in order to have a fuse switch unit. Locating the fuses in this manner allows for easy access to the fuses and provides for a more compact fuse switch unit, thereby helping to reduce the overall size of a panelboard incorporating such fuse switch units. The switch operating mechanism 72 is of the type shown in FIG. 1 and others that are well known in the art. The housing 60 is of a corrosion resistant zinc coated sheet enclosure having electrostatically deposited paint finish, however it may also be made of other materials such as a molded plastic material shown in FIG. 1. Its possible to operate the switch in the range with incoming ratings from 400 amps to 800 amps and outgoing fuse ratings from 6 amps to 400 amps.

While there have been shown and described what are at present considered the preferred embodiments of the invention, it will be obvious to those skilled in the art that various changes and modifications may be made therein within departing from the scope of the invention as defined by the independent claims.

What is claimed is:

1. A switch unit comprising:
   a) a housing of generally rectangular form, the housing having a number of faces;
   b) an inlet terminal positioned on one of said faces of the housing for resilient engagement with a busbar;
   c) separable switch contacts electrically coupled with said inlet terminal;
   d) a switch mechanism positioned within the housing, said switch mechanism including an operating handle, operable to open and close said contracts in a quick make or break manner;
   e) an outlet terminal electrically coupled to said switch mechanism; and
   f) link means positioned within the housing, said link means mounted on said switch mechanism between said switch mechanism and the operating handle, said link means being electrically coupled in series with said inlet terminal, separable contacts and outlet terminal.

2. The switch unit according to claim 1 wherein said link means comprises an electrical conductor.

3. The switch unit according to claim 1 wherein said link means comprises a fuse link.

* * * * *